(12) United States Patent
Gicquel et al.

(10) Patent No.: US 6,707,943 B2
(45) Date of Patent: Mar. 16, 2004

(54) METHOD OF MONITORING THE QUALITY OF DISTRIBUTED DIGITAL IMAGES BY DETECTING FALSE CONTOURS

(75) Inventors: Jean-Charles Gicquel, Rennes (FR); Stéphane Pefferkohn, Rennes (FR); Emmanuel Wyckens, St Medard sur Ille (FR); Jean-Louis Blin, Rennes (FR)

(73) Assignees: France Telecom, Paris (FR); Telediffusion de France, Paris (FR)

( * ) Notice: Subject to any disclaimer, the term of this patent is extended or adjusted under 35 U.S.C. 154(b) by 619 days.

(21) Appl. No.: 09/777,028

(22) Filed: Feb. 5, 2001

(65) Prior Publication Data

US 2001/0022852 A1 Sep. 20, 2001

(30) Foreign Application Priority Data

Feb. 21, 2000 (FR) ............................ 00 02095

(51) Int. Cl.$^7$ ................................. G06K 9/48
(52) U.S. Cl. ................ 382/199; 382/266; 382/274; 382/107; 348/14.15; 348/97; 348/100
(58) Field of Search ................ 382/165, 107, 382/190, 199, 218, 219, 242, 266, 274; 358/537, 538, 452, 453; 348/26, 29, 14.15, 96, 97, 99, 100, 108

(56) References Cited

U.S. PATENT DOCUMENTS 5,587,927 A * 12/1996 Nagao et al. ............... 702/167
5,598,482 A * 1/1997 Balasubramanian et al. ..... 382/199
6,031,935 A * 2/2000 Kimmel ...................... 382/173
6,185,341 B1 * 2/2001 Ishida et al. ................ 382/266
6,438,272 B1 * 8/2002 Huang et al. ............... 382/286

FOREIGN PATENT DOCUMENTS

EP 0 797 349 9/1996
WO 94/09592 4/1994

OTHER PUBLICATIONS

Chaddha et al., Psycho–Visual based Distortion Measures for Monochrome Image and Video Compression, *Proceedings of the Asilomar Conference, N.Y. IEEE*, pp. 841–845 (1993).
Lee et al., "Efficient Algorithm and Architecture for Post–Processor in HDTV", *IEEE*, vol. 44, No. 1, pp. 16–26 (1998).
French Preliminary Search Report dated Oct. 2, 2000, Appl. No. FR 0002095.

* cited by examiner

Primary Examiner—Timothy M. Johnson
Assistant Examiner—Yosef Kassa
(74) Attorney, Agent, or Firm—Marshall, Gerstein & Borun LLP (57) ABSTRACT

A method and device for monitoring the quality of distributed digital images coded by blocks of pixels in which a false contour phenomenon may be generated when the image is reproduced. An image average for pixels represented by at least one luminance respectively chrominance components is calculated and a false contour effect on the basis of a criterion for discriminating the luminance or chrominance component difference between adjacent pixels of adjacent groups of pixels is detected in at least one reference direction of each current image. A visibility coefficient of at least one current image is calculated from the value of the image average speed vector and psycho-visual criteria relating to the existence of the false contour effect in the reference direction.

12 Claims, 7 Drawing Sheets

FIG.3a. CACULATION OF POTENTIAL FALSE CONTOURS

FIG.3b. SUPPRESSION OF SPURIOUS FALSE CONTOURS

METHOD OF MONITORING THE QUALITY OF DISTRIBUTED DIGITAL IMAGES BY DETECTING FALSE CONTOURS

FIELD OF THE INVENTION

The present invention relates to a method of monitoring the quality of distributed digital images by detecting and highlighting false contours.

BACKGROUND OF THE INVENTION

The coding methods currently employed in digital video picture transmission services have significantly reduced the quantity of information to be transmitted.

On the other hand, this reduction in the quantity of information leads to an irrecoverable loss in quality of the image as received and reproduced when compared to the source image. The magnitude of the defects generated in this way depends on the bit rate allocated to the coder and on the complexity of the image, as defined in terms of movement, brightness and texture in particular.

For technical reasons or for reasons of responsibility for the service distributed, it is necessary to evaluate continuously the quality level of the digital video signal transmitted.

Subjective evaluation methods relying on assessment by a human operative are currently widely used. They are costly and are not always totally reliable.

Consequently, it has appeared desirable to develop automatic measuring methods.

One automatic measuring method consists in differentially analysing a reference image and the image to be evaluated and allows for the human visual perception apparatus. This solution is somewhat impractical, however, because it requires the reference image to be available at the receiver.

A second feasible solution is based on an a priori knowledge of defects generated by the coding/decoding system and using statistical methods to assess the quality level of the signal by measuring the rate of occurrence of the defects.

This applies in particular to defects corresponding to a false contour effect generated over all or part of the image during the coding process. In the course of the aforementioned process, at the time of discrete cosine transform (DCT) coding, the digital image to be coded is first divided into image blocks of fixed size. The image blocks are then coded and quantised. During decoding of the image, spatial distortion between more or less perfectly reproduced blocks causes horizontal and/or vertical false contour effects, manifested completely or incompletely in the received decoded image by a spurious grid.

The techniques employed in the first solution entail lengthy and costly subjective evaluation. Also, present-day bit stream analysers, which are needed to analyse the receive images, do not provide all of the information needed to monitor the perceived visual quality and correct functioning of the service. In fact, few such analysers are capable of reflecting the perceived final quality of the received images.

Where differential analysis techniques are concerned, differential objective models require the non-coded source image to be available at the receiver, as previously mentioned. For this reason, the sequences analysed are necessarily of short duration, of the order of one second, and are therefore not representative of the service evaluated. Some defects therefore escape analysis and in particular there remain problems with synchronising the source and coded images.

Finally, because of the shortness of the sequences analysed, the analysis performed is generally discontinuous and serious errors can therefore escape analysis.

The techniques employed in the second solution appear to be even less developed.

They include the technique described in patent application EP 0 797 349 in which the object of the technique described is to highlight a block effect by gradient calculation using a Sobel filter and thereby to obtain a mask of the global and local contours. In the aforementioned method, the block effect, substantially corresponding to the false contour effect, is discriminated on the basis of false contour information which is part of the filtering window, which has a particular dimension.

SUMMARY OF THE INVENTION

One object of the present invention is to remedy the drawbacks of the prior art techniques.

Another object of the present invention is to provide a method that can be used in real time to monitor the quality of distributed digital images by detecting false contours.

Another object of the present invention is to provide a sui generis method of monitoring the quality of distributed digital images based on statistically analysing the content of usable images of a digital video sequence with no reference to any source image or to any source image coding block dimension.

Another object of the present invention is to provide a method which can be used on-line to monitor the quality of distributed digital images by detecting false contours, with no disruption of the provision of the distributed service.

Another object of the present invention is to provide a method of monitoring the quality of distributed digital images by detecting false contours that enables the provision of a distributed digital video image surveillance service.

The method in accordance with the present invention of monitoring the quality of digital images coded by blocks of pixels when the coding process generates a false contour phenomenon when the image is decoded and reproduced is noteworthy in that, for each successive current image, it calculates an image average speed vector representative of the average speed of pixels represented by at least one of their luminance, respectively chrominance, components, between said current image and the preceding image, detecting in at least one reference direction of said current image a false contour effect on the basis of a criterion discriminating the luminance, respectively chrominance, component difference between adjacent pixels of adjacent groups of pixels, and calculating a visibility coefficient of at least one current image from the value of the current image average speed vector and psycho-visual criteria relating to the existence of the false contour effect in the reference direction.

The method according to the present invention can be applied to the surveillance and management of broadcast and distributed digital video images with real time intervention.

BRIEF DESCRIPTION OF THE DRAWING

The method according to the present invention will be better understood after reading the description and examining the drawings, in which.

DETAILED DESCRIPTION OF THE DRAWING

The method in accordance with the present invention of monitoring the quality of digital images will now be described in more detail with reference to FIG. 1 and the subsequent figures.

The method according to the present invention can be applied to any digital signal representative of successive images $I_n$, $I_{n-1}$, where $I_{n-1}$ represents the preceding image and $I_n$ represents the current image of a succession of digital images.

The digital images are conventionally coded by blocks of pixels and the coding process can generate a false contour phenomenon when each image received after distribution is decoded and reproduced. The false contours can take the form of complete or incomplete reticulation of the image in the form of a grid with a mesh having the dimensions of the blocks of pixels used to code the image on transmission.

Figure 1:
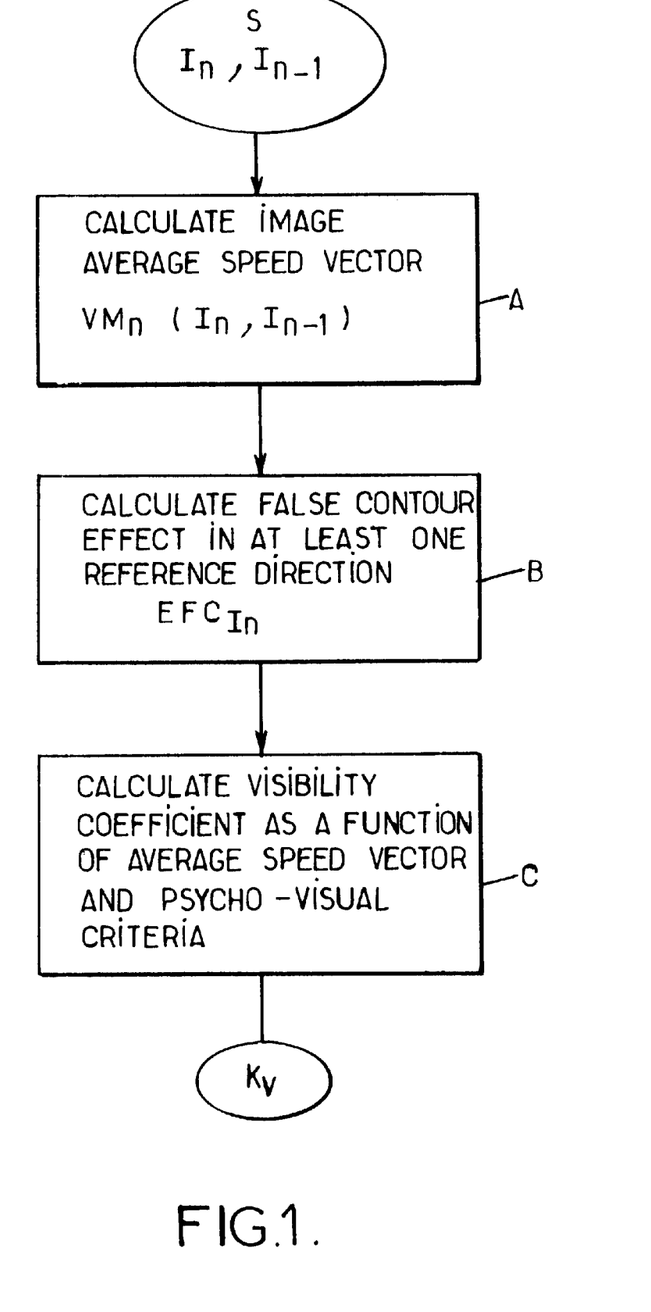
FIG. 1 is a flowchart showing one example of a method in accordance with the present invention for monitoring the quality of distributed digital images by detecting false contours.

For a given succession of images, and starting with a digital signal S shown in FIG. 1 supporting successive images $I_n$ and $I_{n-1}$, a step A of the method according to the present invention consists of calculating for each successive current image an image average speed vector representative of the average speed of pixels represented by at least one of their luminance and/or chrominance components. The image average speed vector is calculated from the current image $I_n$ and the preceding image $I_{n-1}$.

To implement the aforementioned step A, the signal S can be any image coding digital signal and in particular a 4:2:2 format digital video signal, for example, although this example is not limiting on the invention. To implement the method according to the present invention it is sufficient for the digital signal supporting successive images to include separable luminance Y and chrominance Cr, Cb components of the video signal.

Thus, the method in accordance with the invention of calculating the image average speed vector in step A can be carried out for each of the luminance and/or chrominance components in parallel and the calculation results can then be used separately or in combination. Using the calculation results separately lightens the calculation workload, whereas using them in combination provides more accurate values representative of the aforementioned image average speed vector.

At the end of step A, there is available an image average speed vector denoted in the following general form for one of the luminance, respectively chrominance, components:

$$VM_n(I_n, I_{n-1})$$

Step A is followed by a calculation step B to detect a false contour effect in at least one reference direction of the current image $I_n$. The false contour effect is calculated according to a criterion for discriminating the luminance and/or chrominance component difference between adjacent pixels of adjacent groups of pixels in the aforementioned reference direction. The false contour effect is denoted $EFC_{In}$ for a false contour effect consisting of a grid extending partly or substantially totally in the vertical direction of scanning successive lines.

The reference direction can be either the line scanning direction, i.e. the horizontal direction, and/or the frame scanning direction, i.e. the vertical direction, of the current image $I_n$.

Step B, and naturally step A, are followed by a step C of calculating a visibility coefficient for at least one current image $I_n$ from the current image average speed vector $VM_n(I_n, I_{n-1})$ and psycho-visual criteria relating to the existence of the false contour effect in the aforementioned reference direction, i.e. from the value $EFC_{In}$.

The visibility coefficient is denoted $K_v$ in FIG. 1 and its value is explained later in the description.

Although steps A and B are shown as executed successively in FIG. 1, by way of example, the order of execution of these steps can be reversed. Also, these steps can be executed in parallel, by implementing a process for execution of separate tasks.

The method in accordance with the present invention will now be described with reference to FIGS. 2a to 2d, 3a to 3c and 4a, 4b and, in order not to burden the description as a whole, in the non-limiting situation in which step A uses the luminance component Y and the reference direction chosen is the vertical frame scanning direction, for example.

The method according to the present invention applies to sequences of successive digital images $I_n$ which have a size of N×M pixels where N is the number of lines and M is the number of columns, X designates the horizontal direction and Y designates the vertical direction.

With regard to implementing step A to calculate the image average speed vector, movement between two successive images (current image $I_n$ and preceding image $I_{n-1}$) can be detected in the conventional way using a block matching method known in the art, the movement detection method corresponding to that recommended by the MPEG-2 standard, for example, which method, essentially applied to correcting the display of dynamic video images, in particular their chrominance components, is very accurate but costly in terms of calculation time.

An object of the present invention is to provide a simpler, faster and specific method of detecting movement between two successive images, in order to be able to calculate the average speed between two images substantially in real time.

The method of calculating average speeds between two images specific to the present invention also highlights the movement of blocks of pixels between two successive images, as represented by the modulus of the horizontal and vertical displacement vector between two successive images, namely the current image $I_n$ and the preceding image $I_{n-1}$.

The method of calculating the aforementioned specific image average speed vector will now be described with reference to FIGS. 2a to 2d.

Figure 2A:
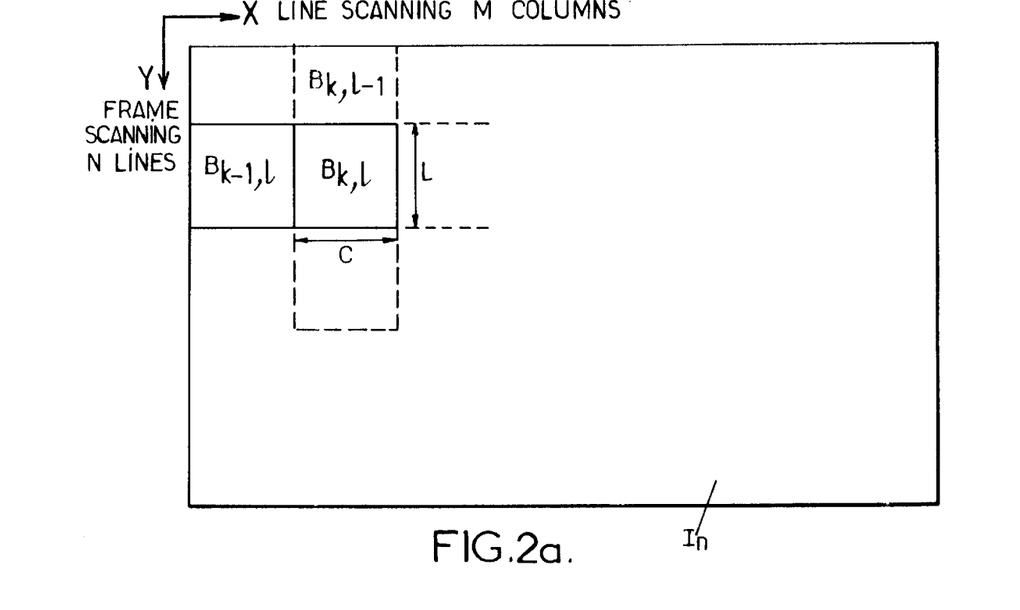
FIGS. 2a to 2d relate to details of the implementation of a method of calculating the image average speed vector specifically suitable for the method according to the present invention.

Referring to FIG. 2a, to apply the specific method of calculating the image average speed vector in step A, the current image $I_n$ is divided into several blocks $B_{k,l}$ where l designates the line address and k the column address of the block concerned.

It is particularly advantageous if the dimensions of the block are chosen with no regard to the dimensions of the coding block of the digital signal transmitted. This is to avoid all risk of correlation between the meshing of false contours and the meshing of the division into blocks used in conjunction with FIG. 2a in the context of the method according to the present invention.

By way of non-limiting example, the height of each block $B_{k,l}$ can be defined by an integer number of lines L and the width of the block can be formed of an integer number of columns C. By way of non-limiting example, the height and the width of each bloc $B_{k,l}$ can be equal to 144 pixels. The division of the image into blocks as shown in FIG. 2a is of course effected conventionally by storing all of the image pixels in memory and successively addressing the addresses k, l defining the block concerned.

Figure 2B:
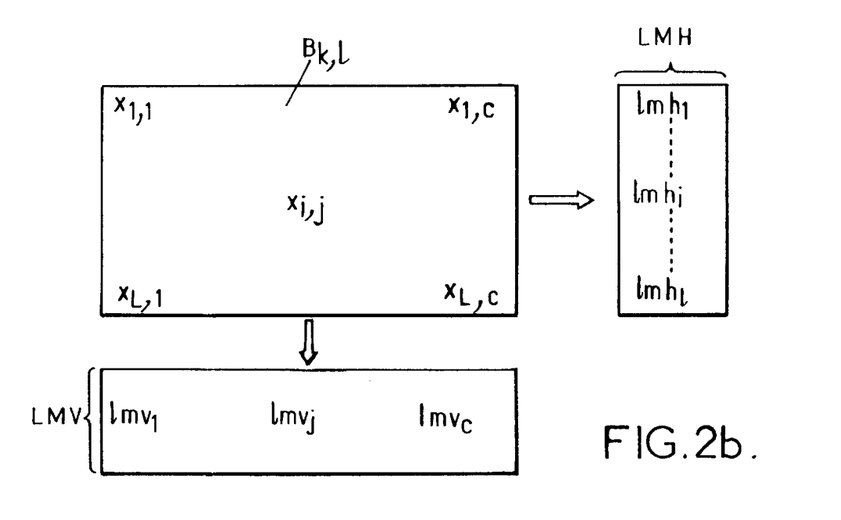
Figure 2C:
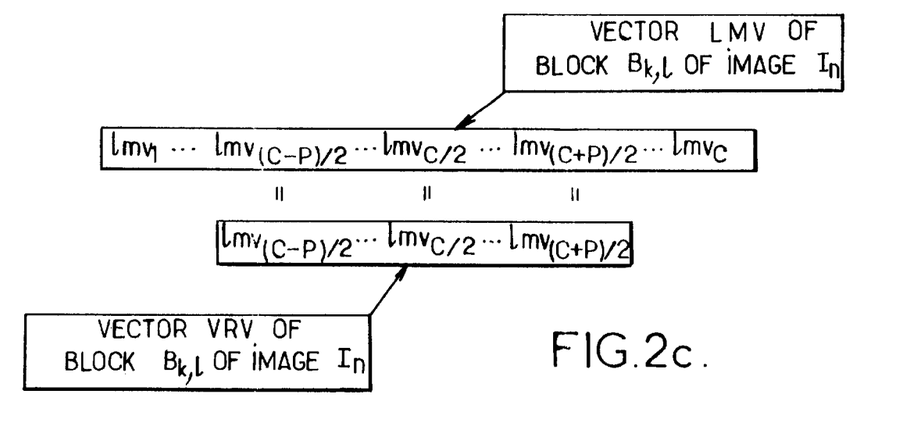
Figure 2D:
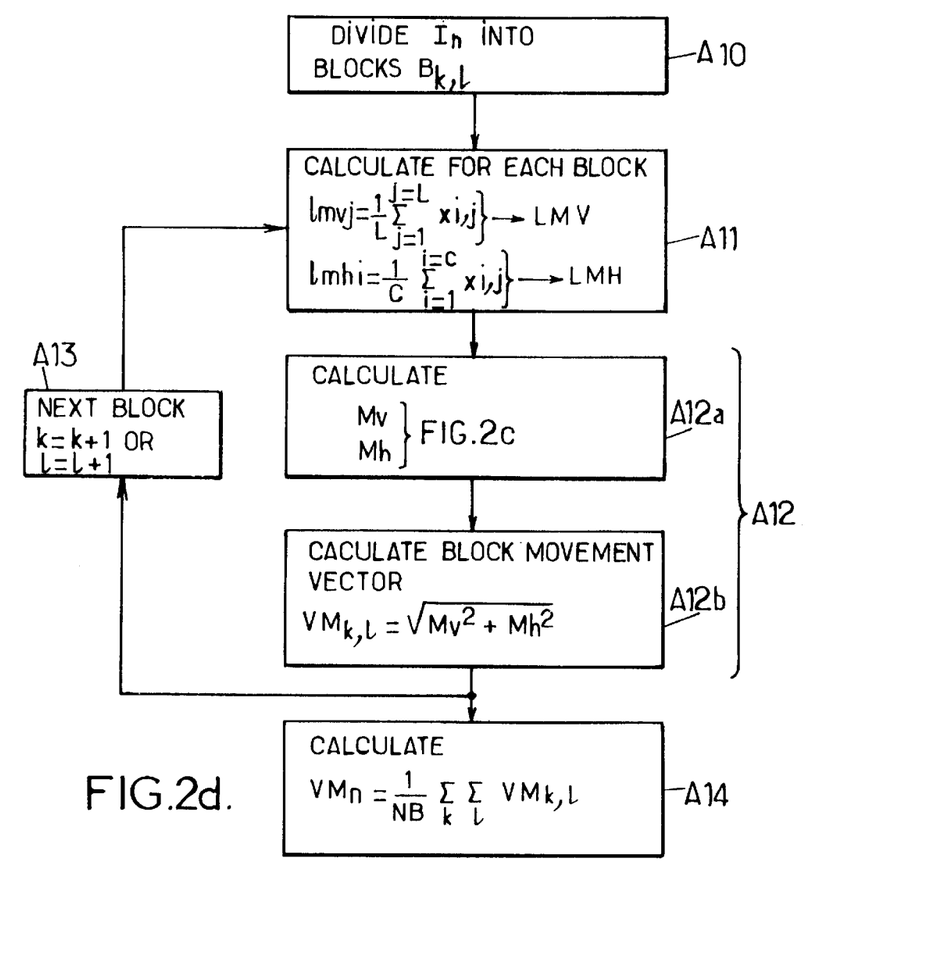

The step of dividing the current image is step A10 in FIG. 2d.

After this step of dividing the current image, the step of calculating an average speed vector (step A11 in FIG. 2d) consists of calculating an average luminance and/or chrominance component value for each block of the current image $I_n$.

Referring to FIG. 2b, step A11 is executed in the following manner.

The average component value is defined by a line component vector representative of the average of the values of successive image pixels constituting columns constituting that image block and by a column component vector representative of the average of the values of the successive image pixels constituting lines constituting the same image block.

Thus, referring to FIG. 2b, for each block $B_{k,l}$ of the image $I_n$ with a size of L lines by C columns, a line vector LMV and a column vector LMH are calculated as follows:

LMV is a line vector of size C whose components are denoted $lmv_j$, $j \in [1,C]$ and which represents the average of the luminances of the column j of pixels of value $x_{i,j}$ of block $B_{k,l}$ for $i \in [1,L]$. Each component satisfies equation (1):

$$lmv_j = \frac{1}{L}\sum_{i=1}^{i=L} x_{i,j} \qquad \text{Equation 1}$$

LMH is a column vector of size L whose components are denoted $lmh_i$, $i \in [1,L]$ and which represent the average of the luminances of the line i of pixels of value $x_{i,j}$ of block $B_{k,l}$ for $j \in [1,C]$. Each element satisfies equation (2):

$$lmh_i = \frac{1}{C}\sum_{j=1}^{j=C} x_{i,j} \qquad \text{Equation 2}$$

FIG. 2b shows the line vectors LMV and column vectors LMH obtained from the value of the pixels $x_{i,j}$ of the block $B_{k,l}$ concerned.

Step A11 is followed by a step A12 which consists of calculating, for each block $B_{k,l}$, a block movement vector denoted $VM_{k,l}$ from a block movement vector component in the first reference direction and a block movement vector component in the second reference direction.

As shown in FIG. 2d, the aforementioned step A12 can consist of calculating a horizontal movement vector Mh, respectively a vertical movement vector Mv, for the block concerned using the least squares method. To this end, in the block concerned $B_{k,l}$ of the current image $I_n$, a search vector VRH is chosen made up of P pixels from the centre of the vector LMH and a search vector VRV is chosen made up of Q pixels from the centre of the vector LMV previously described with reference to FIG. 2b. The definition of the search vectors VRH and VRV is shown by way of example in FIG. 2c only for the line vector LMV in order not to overcomplicate the drawing and this description.

When the size of a block $B_{k,l}$ is 144×144 pixels, it is advantageous if P=Q=80 pixels, for example, as previously mentioned.

The movement of the search vector VRH in the vector LMH of the block $B_{k,l}$ concerned of the current image in the least square sense is then looked for. By convention, the index m designates the image on which the displacement is calculated, which image can be offset a few units relative to the current image $I_n$. The displacement is calculated using the least squares method previously referred to.

The same operation is then repeated for the movement of the search vector VRV. This is not shown in the drawings, as previously mentioned.

Following the above operations, the values of the movement vector Mv in the vertical direction, respectively the movement vector Mh in the horizontal direction, are obtained from the following equations:

$$Mh = \min_{d}\{S_d\} \text{ with } \frac{2-C+P}{2} \le d \le \frac{C-P}{2} \qquad \text{Equations 3}$$

$$S_d = \sum_{i=(c-p)/2}^{i=(C+P)/2} |lmv_{i,m} - lmv_{i+d,m}|$$

The above equations (3) concern the value of the block movement vector Mh in the horizontal direction, and the value of the block movement vector Mv in the vertical direction can be obtained from equations (3) merely by replacing h with v, C with L and P with Q.

Step A12a is followed by a step A12b for executing the aforementioned step A12 and shown in FIG. 2d. Step A12b calculates the block movement vector satisfying equation (4):

$$VM_{k,l} = \sqrt{Mv^2 + Mh^2} \qquad \text{Equation 4}$$

The calculation is repeated for each block $B_{k,l}$ by returning (A13) to the next block with k=k+1 or l=l+1 in order to explore all the blocks into which the current image $I_n$ has been divided.

Where step A12a is concerned, the least squares method used establishes each block movement vector component in the first and second reference directions as the distance, expressed as a number of pixels, in each reference direction of a group of pixels for which the luminance, respectively chrominance, component difference is a minimum.

After obtaining the block movement vector $VM_{k,l}$ for each block of the current image, the image average speed vector calculation step (step A14 of FIG. 2d) consists of calculating the image average speed vector as the average of the block movement vectors for all of the blocks constituting the current image $I_n$. The image average speed vector satisfies equation (5):

$$VM_n = \frac{1}{NB}\sum_{k}\sum_{l} VM_{k,l} \qquad \text{Equation 5}$$

In the above equation, NB represents the number of blocks in the image.

The method of calculating the false contour effect in at least one reference direction (step B in FIG. 1) will now be described in more detail with reference to FIGS. 3a, 3b and 3c.

Figure 3A:
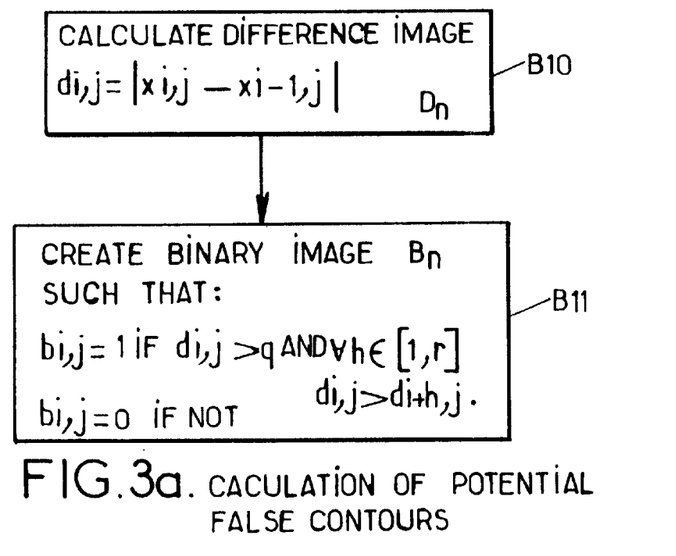
FIGS. 3a, 3b and 3c relate to details of the implementation of a specific method of calculating the false contour effect in a reference direction of the image.

As shown in FIG. 3a, the aforementioned step B can advantageously include at least one step B10 consisting of calculating the absolute value of the luminance, respectively chrominance, component difference between the adjacent pixels of each pair of successive rows of pixels in the aforementioned reference direction to constitute a difference image $D_n$ in that direction.

Figure 3B:
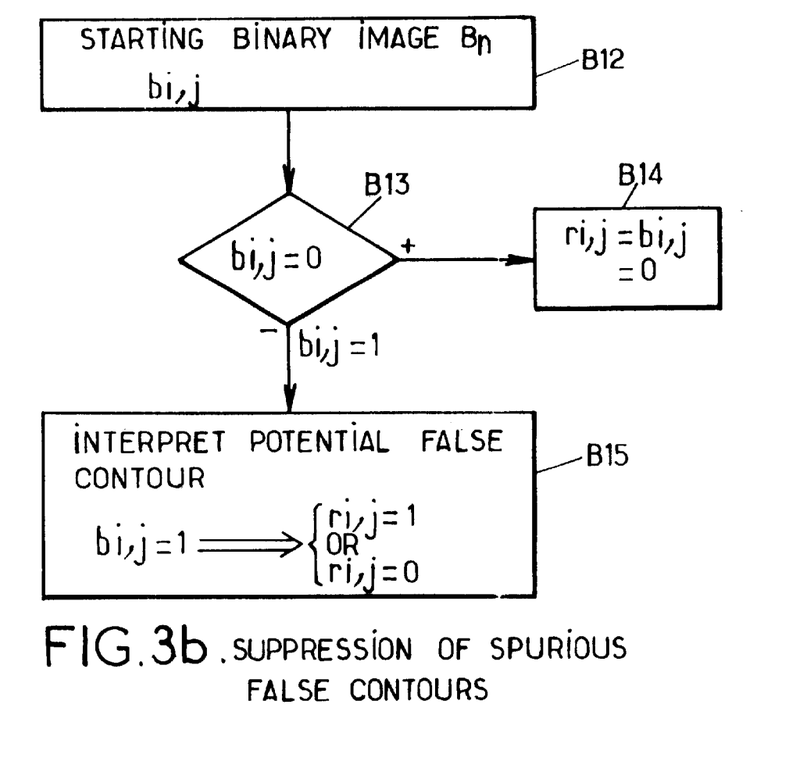

The description relating to FIGS. 3a and 3b and the subsequent figures refers to detecting horizontal false contour effects in the current image concerned.

Accordingly, to obtain the difference image $D_n$, the absolute value of the difference between the value of the current pixel $x_{i,j}$ of line i of the current image and the value of the pixel of the preceding line $x_{i-1,j}$ of the same current image $I_n$ is calculated in step B10. The absolute value of this difference satisfies equation (6):

$$d_{i,j} = |x_{i,j} - x_{i-1,j}| \quad \text{Equation 6}$$

Following step B10, there is therefore available a difference image $D_n$ of size (N−1)×M where N−1 designates the number of lines and M designates the number of columns of the aforementioned difference image.

Step B10 is followed by a step B11 consisting of generating a binary image $B_n$ from the difference image $D_n$.

To generate the binary image $B_n$, each point of the binary image is assigned a particular binary value if the absolute value of the difference $d_{i,j}$ is greater than a particular number q of luminance, respectively chrominance, levels with which the current image $I_n$ is coded, and if the same absolute value of the difference $d_{i,j}$ is greater than the absolute values of the difference of the luminance, respectively chrominance, components of a number h of adjacent rows of pixels in the same reference direction. Accordingly, in step B11, the assignment of the value 1 corresponding to the aforementioned particular binary value of the bit $b_{i,j}$ satisfies equation (7):

$$b_{i,j} = 1 \quad \text{if } d_{i,j} > q \text{ and } \forall h, 1 \leq h \leq r, d_{i,j} > d_{i+h,j} \quad \text{Equation 7}$$

$$b_{i,j} = 0 \quad \text{if not}$$

In the above equation, q represents the number of luminance, respectively chrominance, levels that the value $d_{i,j}$ must be greater than, h designates the next row of pixels in the same reference direction, and r designates the maximum number of adjacent rows of pixels taken into account.

In one preferred embodiment, in which q=3, there are three luminance, respectively chrominance, levels when the image is coded to the 4:2:2 format, r=6 and h ∈[1,r].

The points or bits $b_{i,j}$ of the binary image $B_n$ are therefore assigned the value 1 when the current absolute difference is greater than three 4:2:2 levels and, for any given column j of the difference image $D_n$, the current absolute difference $d_{i,j}$ is greater than the difference of the rows of pixels for the lines between i+1 and i+6.

Otherwise, i.e. if the first condition of equation (7) is not satisfied, the value 0 is assigned to any bit or point $b_{i,j}$.

Accordingly, at the end of step B11, there is available a binary image $B_n$, which represents the existence of potential false contours for the current image $I_n$.

Step B of calculating false contours also suppresses spurious false contours in the binary image $B_n$ obtained after the aforementioned step B11.

To this end, as shown in FIG. 3b, and starting with the set of values of bits $b_{i,j}$ of the binary image $B_n$ in a starting step B12, the step of calculating a false contour effect in at least one reference direction of the current image consists of assigning the points of the final binary image a binary value $r_{i,j}$ in the following fashion.

Following a test B13 to establish if the value of the bit $b_{i,j}$ is equal to the binary value representative of the absence of potential false contours, i.e. the value 0 in the previous example, if the binary value of the bit $b_{i,j}$ is the complemented binary value, i.e. the value 0 representative of absence of potential false contours, the bit $r_{i,j}$ of the final binary image is assigned the value of the bit $b_{i,j}$, i.e. the value 0 in the previous example. This operation is represented in step B14 on a positive response to test B13 by the equation:

$$r_{i,j} = b_{i,j} = 0$$

In contrast, in the event of a negative response to test B13, for any point belonging to a row in the reference direction of the binary image $B_n$ representative of potential false contours, and whose binary value is the binary value representative of a potential false contour, i.e. $b_{i,j}=1$, a procedure B15 for interpreting the potential false contour is then launched, the final binary value $r_{i,j}$ being assigned the value 0 or 1 representative of the existence of a final false contour, respectively the absence of false contours, depending on the aforementioned interpretation.

One particular embodiment of the method of interpreting potential false contours represented in step B15 in FIG. 3b will now be described with reference to FIG. 3c.

Figure 3C:
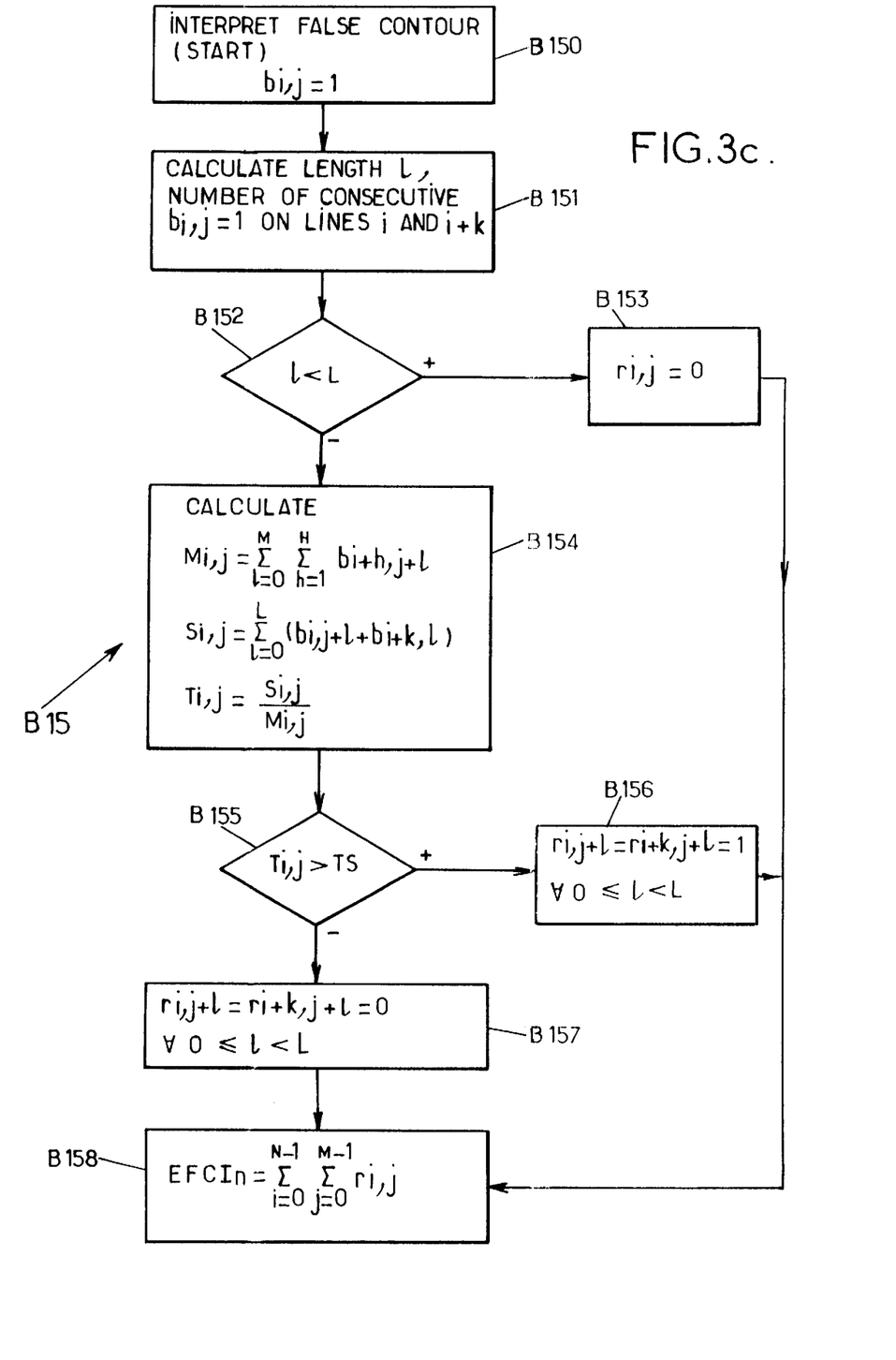

Referring to the aforementioned FIG. 3c, the step of interpreting potential false contours can include a starting step B150 for interpreting potential false contours on the basis of the bit or point value $b_{i,j}=1$. That step is followed by a step B151 which consists of discriminating, in the row in the reference direction and in a parallel row offset from that row by a number k of points, a number l of successive points whose binary value is equal to the binary value representative of a potential false contour, i.e. the binary value 1.

Step B151 is followed by a step B152 which uses a less than comparison test to compare the number l of consecutive points with a threshold value L for the existence of a false contour.

In the event of a positive response to test B152, i.e. if the number l of consecutive points is less than the threshold value L, any point of the final binary image is assigned the complemented binary value, i.e. the value 0 representative of the absence of potential false contours, in a step B153. That assignment is denoted $r_{i,j}=0$. The potential false contour corresponding to a spurious potential false contour is then eliminated.

In the event of a negative response to test B152, and if, on the other hand, the number l of consecutive points is greater than the threshold value L, test B152 is followed by a step B154 in which the signal-to-noise ratio is calculated for each segment of points contained in an area of the binary image representative of potential false contours, that area being defined as an individual block whose apex corresponds to the point concerned at address i,j and whose dimension in the first and the second reference direction is L×h.

The signal-to-noise ratio $T_{i,j}$ is generally defined as follows.

A first quantity is calculated which satisfies equation (8):

$$M_{i,j} = \sum_{l=0}^{L} \sum_{h=1}^{H} b_{i+h,j+1} \qquad \text{Equation 8}$$

and a second quantity is calculated which satisfies equation (9):

$$S_{i,j} = \sum_{l=0}^{L} (b_{i,j+1} + b_{i+k,j+1}) \qquad \text{Equation 9}$$

The signal-to-noise ratio $T_{i,j}$ is given by the ratio of the first and second quantities:

$$T_{i,j} = S_{i,j}/M_{i,j}$$

In one specific embodiment, k has the value 8, l has the value 6 and H has the value 7.

The aforementioned step B154 is followed by a test step B155 comparing the value of the signal-to-noise ratio with a threshold value $T_S$. The comparison is a greater than comparison.

In the event of a positive response to the comparison step B155, i.e. if the signal-to-noise ratio is greater than the threshold value $T_S$, the binary value representative of a false contour is assigned to any point of the final binary image belonging to the segment of length L in the first reference direction and to any point of the final binary image belonging to a parallel segment of the same length offset by the amount k in the second reference direction. This operation, represented in step B156, satisfies equation (10):

$$\text{If } T_{i,j} > T_S \; \forall 0 \leq l < L \; r_{i,j+l} = r_{i+k,j+l} = 1 \qquad \text{Equation 10}$$

In the event of a negative response to test B155, i.e. if the value of the signal-to-noise ratio is less than the threshold value $T_S$, the complemented binary value representative of the absence of false contours, i.e. the binary value 0, is assigned to the point belonging to the segment of the final binary image in a step B157. That assignment satisfies equation (11):

$$\text{If not } \forall 0 \leq l < L \; r_{i,j+l} = r_{i+k,j+l} = 0 \qquad \text{Equation 11}$$

The condition If not designates non-verification of the condition of equation (10).

After steps B153, B156 and B157, during which potential false contours have been interpreted either as spurious false contours or as final false contours, the method according to the present invention then consists of calculating, for the final binary image $B_n$ corresponding to the current image $I_n$, a coefficient representative of the existence of false contours, i.e. the coefficient $EFC_{In}$, by summing all the binary values representative of a false contour, i.e. the final binary values $r_{i,j}$ available from steps B153, B156 and B157 onwards. The coefficient representative of the existence of false contours then satisfies equation (12):

$$EFC_{I,n} = \sum_{i=0}^{N-1} \sum_{j=0}^{M-1} r_{i,j} \qquad \text{Equation 12}$$

In the method in accordance with the invention of monitoring the quality of digital images, the value of the image average speed vector represented in step A in FIG. 1 and the value of the coefficient representative of the existence of false contours obtained after executing step B in the same FIG. 1 are then used to calculate a visibility coefficient, namely the coefficient $K_v$ previously referred to.

As a general rule, the coefficient can be calculated for at least one current image but is preferably calculated for a succession of current images from the value of the aforementioned current image average speed vector and psycho-visual criteria relating to the existence of the false contour effect.

Figure 4A:
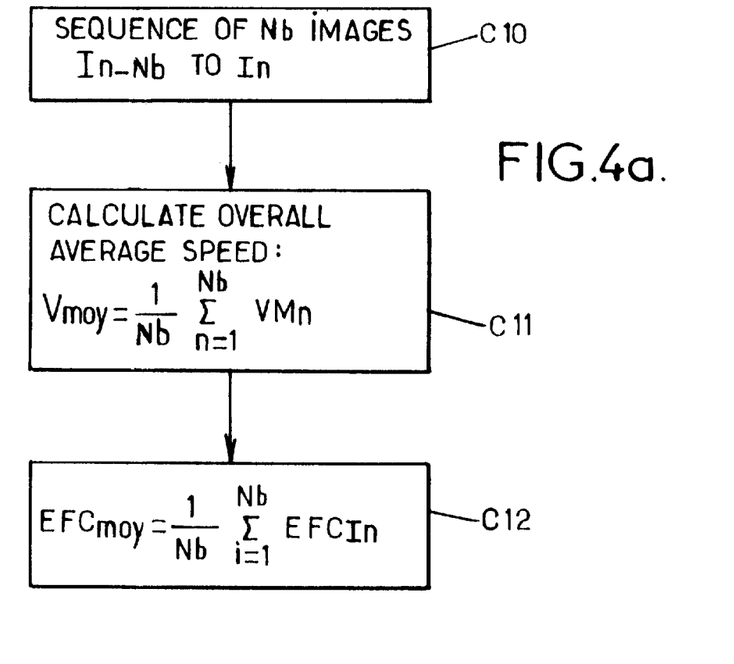
FIGS. 4a and 4b relate to details of the implementation of a specific method of calculating a visibility coefficient as a function of the image average speed vector and psycho-visual criteria for an image or a group of images.

Applying spatial-temporal compensation quantifies the psycho-visual criteria relating to the existence of the false contour effect and produces an overall visibility score over a sequence of images, i.e. over at least one image, under conditions that will be described hereinafter with reference to FIGS. 4a and 4b.

To calculate the aforementioned visibility coefficient $K_v$, the method in accordance with the present invention can, in the context of executing step C, include a step C10 which consists of taking into consideration Nb successive images denoted $I_{n-Nb}$ to $I_n$.

Step C10 is followed by a step C11 which consists of calculating the overall average speed for the aforementioned sequence of images, the overall average speed being defined as the average of the average speeds for each successive current image $I_{n-Nb}$ to $I_n$.

The overall average speed $V_{avg}$ therefore satisfies equation (13):

$$V_{avg} = \frac{1}{Nb} \sum_{n=1}^{Nb} VM_n \qquad \text{Equation 13}$$

Step C11 can then be followed by a step C12 which consists of calculating an average false contour effect $EFC_{avg}$ for this particular set of images.

Figure 4B:
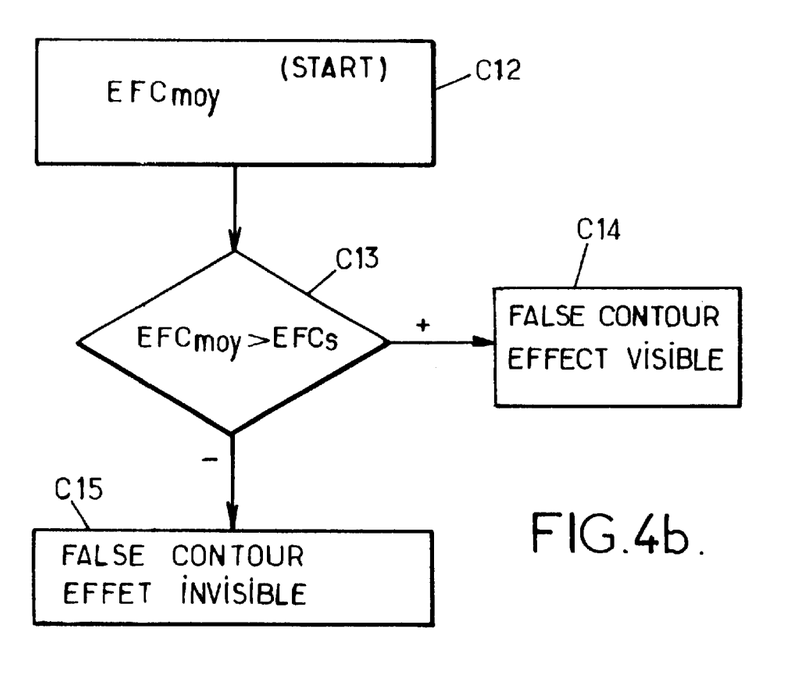

By definition, the average false contour effect is given by the average of the coefficients representative of the existence of false contours of each successive current image. Consequently, the average false contour effect satisfies equation (14):

$$EFC_{avg} = \frac{1}{Nb} \sum_{i=1}^{Nb} EFC_{In} \qquad \text{Equation 14}$$

Where implementing psycho-visual criteria is concerned, and with reference to FIG. 4b, note that the psycho-visual criteria can consist of determining the visibility of the average false contour effect vis-à-vis a particular threshold value. Accordingly, referring to the aforementioned FIG. 4b, after step C12, following which the value of the average false contour effect $EFC_{avg}$ is available, applying psycho-visual criteria can consist of carrying out a comparison test C13 comparing the aforementioned average false contour value to a particular threshold value $EFC_S$.

In the event of a positive response to the greater than comparison carried out in test C13 on the average false contour value vis-à-vis the particular threshold value, the false contour effect is declared visible for the series of images including Nb successive images in step C14.

In contrast, in the event of a negative response to step C13, the false contour effect is declared invisible for the sequence of Nb images in step C15.

Thus the average false contour effect $EFC_{avg}$ can obviously, in itself, constitute the visibility coefficient of at least one current image, i.e. a sequence of Nb successive images. However, and in the embodiment shown in FIG. 4b, the visibility coefficient is preferably associated with a binary variable representative of the existence of a false contour effect which is visible for the sequence of images in step C14, or, to the contrary, a false contour effect that is invisible for the same sequence of images in step C15.

In one preferred embodiment, the particular threshold value $EFC_S$ is chosen as the result of a linear combination of the overall average speed $V_{avg}$.

For example, the particular threshold value satisfies equation (15):

$$EFC_S = a*V_{avg} + b \qquad \text{Equation 15}$$

Experiments have shown that it is beneficial to set the value of a to 200 and that of b to 500.

Accordingly, the average false contour effect is visible if:

$$EFC_{avg} > EFC_S$$

and the average false contour effect is invisible if:

$$EFC_{avg} < EFC_S$$

A device for monitoring the quality of digital images using the method in accordance with the present invention previously described herein will now be described with reference to FIG. 5.

Referring to the aforementioned figure, the device in accordance with the present invention for monitoring the quality of digital images includes at least one module 1 for converting the digital video signal $S/I_n$, $I_{n-1}$ into a dedicated format digital signal. By way of non-limiting example, the video converter module 1 can employ a professional grade IRD (integrated receiver decoder) receiving the digital video signal $S/I_n$, $I_{n-1}$ from a first ISB (inter-satellite band) input or from a MPEG2 input TS. Of course, the use of a module of the above kind is not essential in itself, as the module can be replaced by a remote-controlled receiver, for example, supplying the signal in the 4:2:2 format. The module 1 for converting the digital video signal into a dedicated format digital signal supplies that signal in the 4:2:2 format.

Figure 5:
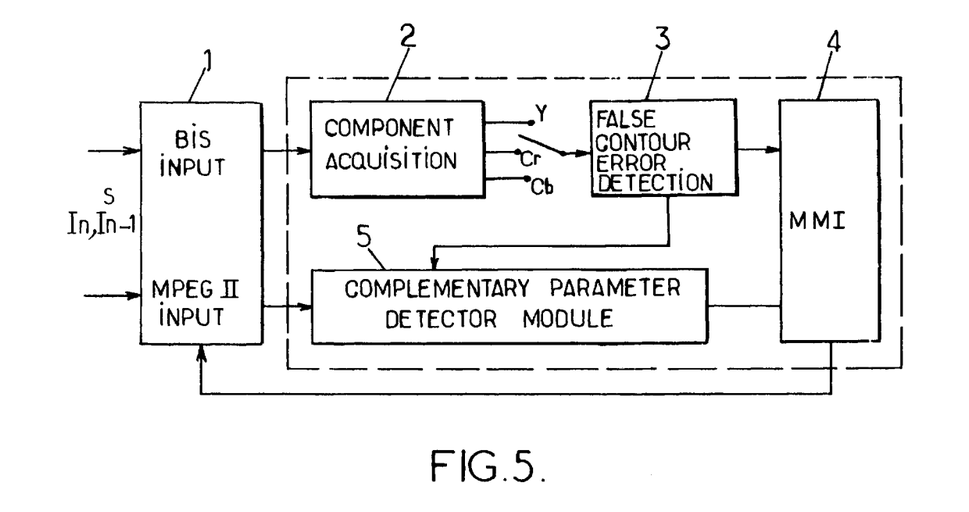
FIG. 5 shows one example of a device according to the present invention for monitoring the quality of distributed digital images by detecting false contours.

Moreover, the device according to the present invention shown in FIG. 5 includes a portable computer system including at least one module 2 for acquiring luminance Y, respectively chrominance Cr, Cb, components, the acquisition module 2 receiving the dedicated format digital signal delivered by the module 1 for converting the digital video signal into a dedicated format digital signal.

The module 2 for acquiring luminous components Y, respectively chrominance components Cr, Cb, then delivers the aforementioned components, which can be chosen together or separately by switching.

The module 2 for acquiring the video frequency components is itself followed by a module 3 for detecting false contour errors and receiving the video frequency components delivered by the aforementioned module 2. It detects the effect of false contours using the previously described method in accordance with the present invention and therefore delivers a detection signal corresponding at least to the calculation of the false contour effect in at least one reference direction.

Moreover, a man-machine interface manager 4 receives the detector signal and is used to generate a representation of the effect of false contours, for example, and to calculate the visibility coefficient Kv.

As shown in FIG. 5, the device according to the present invention can finally include a module 5 for calculating and detecting complementary parameters, the calculation module receiving the digital signal in the dedicated 4:2:2 format delivered by the module 1 and delivering a signal representative of complementary parameters such as digital video signal bit rates. It is controlled by the module 3 for detecting false contour errors.

As a general rule, all the modules 2, 3, 4 and 5 can be implemented by means of a microcomputer, which for this reason is shown in dashed outline in FIG. 5. In particular, the man-machine interface platform management system provides remote control of the module 1 for converting the digital video signal into a dedicated format digital signal.

The system consisting of the microcomputer therefore processes the data, provides and schedules the results and manages various signals to be processed by the module 1 for converting to the dedicated format.

The module 2 for acquiring luminance components Y and chrominance components Cr, Cb can be a dedicated PCI card connected to the format converter module 1. The digital data supplied by the module 2 and therefore by the PCI card is processed by the error detector module 3, which of course implements in software form the various steps of the method according to the present invention as previously described. The task of detecting false contours can therefore be divided between the module 3 and the module 4, as previously described.

By way of non-limiting example, all the corresponding software elements can be installed in ROM, transferred into the RAM of the microcomputer and controlled from the control module 4 constituting the aforementioned man-machine interface MMI.

All of the aforementioned software elements detect the false contour phenomenon in the digital video signal consisting of digital images coded by blocks of pixels if the coding process generates a false contour phenomenon when the image is decoded and reproduced, by operations consisting of, for each successive current image, calculating an image average speed vector representative of the average speed of pixels represented by at least one of their luminance or chrominance components between the current image and the preceding image, detecting in at least one reference direction of the current image a false contour effect in accordance with a criterion for discriminating the luminance or chrominance difference between adjacent pixels of adjacent groups of pixels, and calculating a visibility coefficient of at least one current image from the current image average speed vector value and psycho-visual criteria relating to the false contour effect in the reference direction.

What is claimed is:

1. A method of monitoring the quality of digital images coded by blocks of pixels in which a false contour phenomenon is generated while decoding and reconstructing said coded images, wherein said method consists of, for each successive current image:

calculating an image average speed vector representative of the average speed of pixels represented by at least one of their luminance, respectively chrominance, components, between said current image and an image preceding said current image;

detecting in at least one reference direction of said current image a false contour effect on the basis of a criterion for discriminating the luminance, respectively the chrominance component difference between adjacent pixels of adjacent groups of pixels; and calculating a visibility coefficient of at least one current image from the value of said image average speed vector of said current image and psycho-visual criteria relating to the existence of said false contour effect in said reference direction.

2. The method of claim 1, wherein said at least one reference direction of said current image is the horizontal line scanning direction and/or the vertical frame scanning direction.

3. The method of claim 1, wherein said step of calculating an average speed vector consists of:
  dividing said current image into adjacent image blocks each defined by a particular number of lines and columns of image pixels;
  calculating for each block of said current image a luminance, respectively chrominance, average component value, said average component value being defined by a line component vector representative of the average of the components of successive image pixels of columns constituting said image block and a column component vector representative of the average of the components of pixels of successive images of lines constituting the same image block;
  calculating a block movement vector for each block from a block movement vector component in said first reference direction and a block movement vector component in said second reference direction, each block movement vector component in said first respectively said second reference direction being established as the distance expressed as a number of pixels in each direction of a group of pixels whose luminance respectively chrominance component difference is a minimum; and
  calculating said image average speed vector as the average of said block movement vectors for all the blocks constituting said current image.

4. The method of claim 1, wherein said step of detecting a false contour effect in at least one reference direction of said current image consists of at least:
  calculating the absolute value of the difference of the luminance respectively the chrominance components between the adjacent pixels of each pair of successive rows of pixels in said reference direction to constitute a difference image in said reference direction; and
  generating a binary image representative of the existence of potential false contours in said reference direction from said difference image and assigning each pixel a particular binary value if the absolute value of the difference is greater than the absolute values of the difference of the luminance respectively the chrominance components of a number h of adjacent rows of pixels in the same reference direction or otherwise a complemented binary value.

5. The method of claim 4, wherein said step of detecting a false contour effect in at least one reference direction of said current image further includes, after obtaining said binary image representative of the existence of potential false contours in said reference direction, a step of eliminating from said binary image spurious potential false contours to generate a final binary image representative of false contours, the binary value of the pixels of said final binary image being established so that:
  each point of said final binary image is assigned the binary value of the corresponding point of said binary image representative of the existence of potential false contours if said binary value is the complemented binary value representative of the absence of a potential false contour; and
  for any point in a row in the reference direction of the binary image representative of a potential false contour and whose binary value is the binary value representative of a potential false contour, the final binary value assigned representative of the existence or the absence of a final false contour is determined by an interpretation procedure.

6. The method of claim 5, wherein said interpretation procedure consists in:
  discriminating a number l of successive points whose binary value is equal to said binary value representative of a potential false contour over said row in the reference direction and in a parallel row offset from said row by a number k of pixels; and
  comparing said number l of consecutive points with a threshold value L representative of the existence of a false contour, and
    if the number l of consecutive points is less than said threshold value L, assigning to any point of said final binary image the complemented binary value representative of the absence of potential false contours, said potential false contour corresponding to a spurious potential false contour being thus eliminated;
    if the number l of consecutive points is greater than said threshold value L:
      calculating the signal-to-noise ratio of each segment of points contained in an area of said binary image representative of potential false contours, said area being defined as an individual block whose apex corresponds to said point and whose dimension in the first respectively the second reference direction is L×h;
      comparing said signal-to-noise ratio to a particular value and, if said signal-to-noise ratio is greater than said particular value:
        assigning the binary value representative of a false contour to any point of said final binary image belonging to the segment of length L in said first reference direction and to any point of said final binary image belonging to a parallel segment of the same length offset by the amount k in said second reference direction if said signal-to-noise ratio is greater than said threshold value, and
        assigning the complemented binary value representative of the absence of false contours to said points belonging to said segments of said final binary image otherwise.

7. The method of claim 4, wherein said step of detecting a false contour effect in at least one reference direction of said current image further consists in calculating for said binary image corresponding to said current image a coefficient representative of the existence of false contours by summing all the binary values representative of a false contour.

8. The method according to claim 1, wherein, for a particular sequence of a set of successive current images, said method further consists in:
  calculating the overall average speed for said particular set of successive current images as the average of the average speeds of each successive current image; and
  calculating for said particular set of successive current images an average false contour effect defined as the average of the coefficients representative of the existence of false contours of each successive current image.

9. The method of claim 1, wherein said psycho-visual criteria consist in determining the visibility of the average false contour effect vis-à-vis a particular threshold value, said average false contour effect being declared visible when its value is greater than said particular threshold value and invisible otherwise.

10. The method of claim 9, wherein said particular threshold value is a linear combination of said overall average speed with the parameters of said linear combination being determined experimentally.

11. A device for monitoring the quality of digital images coded by blocks of pixels in which a false contour phenomenon is generated while decoding and reconstructing said coded image, said device including in combination:
- a module for converting digital images into a dedicated format including separate luminance and chrominance components;
- a module for acquiring and separating luminance respectively chrominance components of successive images;
- a module receiving said luminance respectively chrominance components for detecting false contour effects in at least one reference direction on the basis of a criterion for discriminating said luminance respectively said chrominance component difference between adjacent pixels of adjacent groups of pixels from the value of an image average speed vector representative of the average speed of pixels represented by said luminance respectively said chrominance components; and
- a module for calculating and displaying at least one visibility coefficient of at least one current image from the value of said image average speed vector of said current image and psycho-visual criteria relating to the existence of said false contour effect in said reference direction.

12. The device of claim 11, further including a module for calculating complementary parameters such as the bit rate of the digital signal conveying said digital images.

* * * * *

UNITED STATES PATENT AND TRADEMARK OFFICE
CERTIFICATE OF CORRECTION

PATENT NO. : 6,707,943 B2  Page 1 of 1
DATED : March 16, 2004
INVENTOR(S) : Jean-Charles Gicquel et al.

It is certified that error appears in the above-identified patent and that said Letters Patent is hereby corrected as shown below:

Title Page,
Item [76], Inventor, please delete "Pefferkohn" and insert -- Pefferkorn --.

Signed and Sealed this

Twenty-fourth Day of August, 2004

JON W. DUDAS
*Director of the United States Patent and Trademark Office*